(12) United States Patent
Dore

(10) Patent No.: US 9,967,060 B2
(45) Date of Patent: May 8, 2018

(54) TRANSMITTER FOR FBMC SYSTEM WITH BLOCK-ALAMOUTI TYPE SPACE-TIME CODING

(71) Applicant: COMMISSARIAT A L'ENERGIE ATOMIQUE ET AUX ENERGIES ALTERNATIVES, Paris (FR)

(72) Inventor: Jean-Baptiste Dore, Fontanil-Cornillon (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 0 days. days.

(21) Appl. No.: 15/485,700

(22) Filed: Apr. 12, 2017

(65) Prior Publication Data
US 2017/0302408 A1  Oct. 19, 2017

(30) Foreign Application Priority Data
Apr. 13, 2016 (FR) ..................... 16 53276

(51) Int. Cl.
H04L 1/06 (2006.01)
H04L 27/26 (2006.01)
H04L 27/20 (2006.01)

(52) U.S. Cl.
CPC .......... *H04L 1/0668* (2013.01); *H04L 1/0625* (2013.01); *H04L 27/206* (2013.01); *H04L 27/264* (2013.01); *H04L 27/2698* (2013.01)

(58) Field of Classification Search
CPC ... H04L 1/0625; H04L 27/206; H04L 27/264; H04L 1/0668; H04L 27/2698

USPC ......................................... 375/298
See application file for complete search history.

(56) References Cited

U.S. PATENT DOCUMENTS

2014/0348252 A1  11/2014  Siohan et al.

OTHER PUBLICATIONS

French Preliminary Search Report dated Dec. 1, 2016 in French Application 16 53276 filed on Apr. 13, 2016 (with English Translation of Categories of Cited Documents).
Markku Renfors, et al., "A Block-Alamouti Scheme for Filter Bank Based Multicarrier Transmission", European Wireless Conference, IEEE, 2010, 7 pgs.

(Continued)

*Primary Examiner* — Michael Neff
(74) *Attorney, Agent, or Firm* — Oblon, McClelland, Maier & Neustadt, L.L.P.

(57) ABSTRACT

A transmission method and an FBMC transmitter to transmit at least a first and a second block of symbols ($\overline{X}_0$, $\overline{X}_1$), each symbols block including a temporal sequence of L vectors with predetermined size N. It uses a first and a second FBMC modulation channel, each FBMC modulation channel being associated with an antenna. During a first use of the channel, the vectors of the first block and the vectors of the second block are input to the first and to the second FBMC modulation channels respectively, in the order of the temporal sequence. During a second use of the channel, the vectors of the first and second blocks are multiplied by a factor $j^{L-1}$ respectively and $-(j^{L-1})$ input to the second and to the first FBMC modulation channels respectively, in the inverse order of the temporal sequence.

9 Claims, 10 Drawing Sheets

(56) References Cited

OTHER PUBLICATIONS

R. Zakaria, et al., "On interference cancellation in Alamouti coding scheme for filter bank based multicarrier systems", The Tenth International Symposium on Wireless Communication Systems, 2013, 5 pgs.
Botaro Hirosaki, "An Orthogonally Multiplexed QAM System Using the Discrete Fourier Transform", IEEE Transactions on Communications, vol. COM-29, (7), 1981, 8 pgs.
Pierre Siohan, et al., "Analysis and Design of OFDM/OQAM Systems Based on Filterbank Theory", IEEE Transactions on Signal Processing, vol. 50, (5), 2002, 14 pgs.
M. Bellanger, et al., "FBMC physical layer: a primer", PHYDYAS, 2010, 31 pgs.
Erik Lindskog, et al., "A Transmit Diversity Scheme for Channels with Intersymbol Interference", IEEE, 2000, 5 pgs.

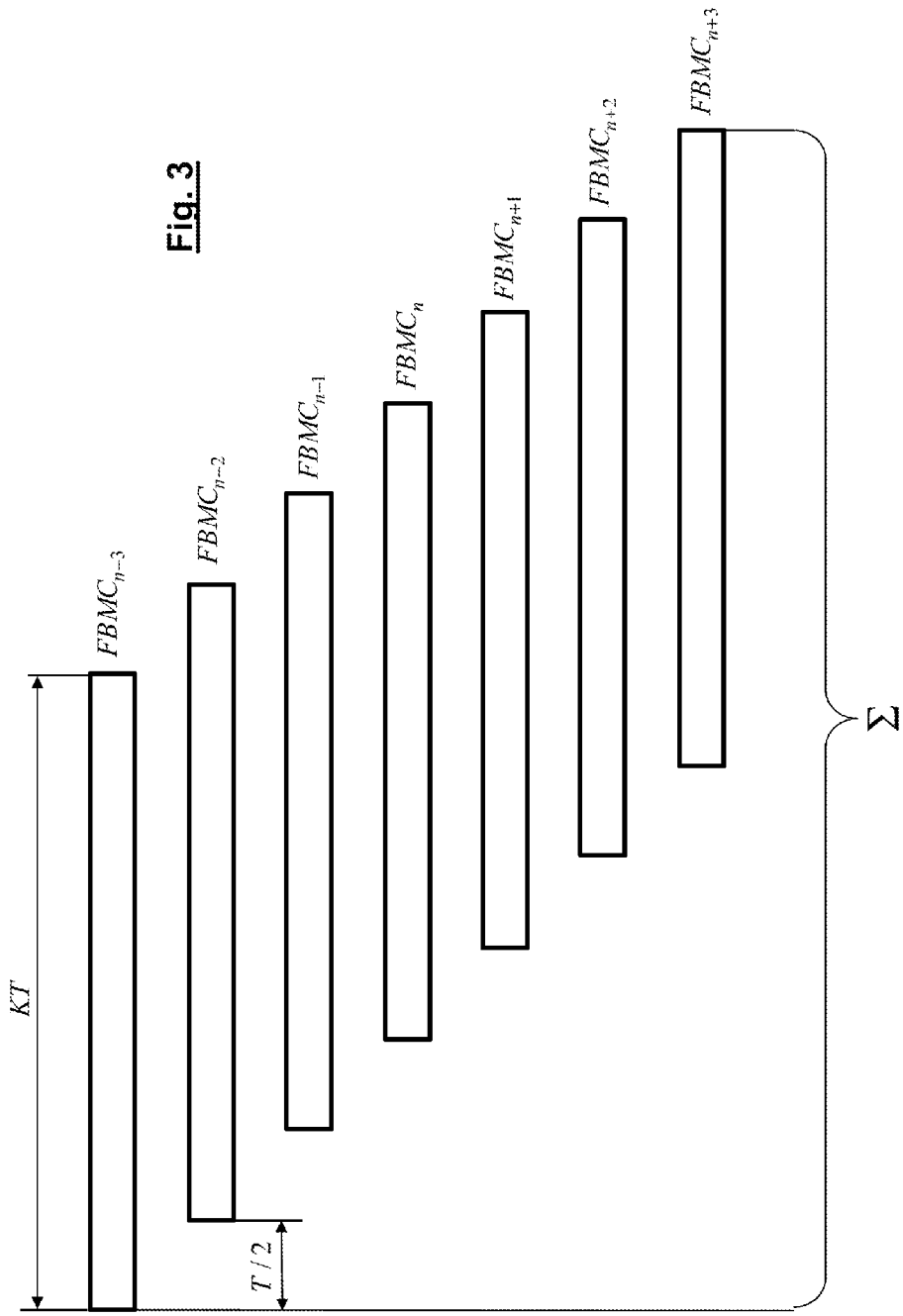

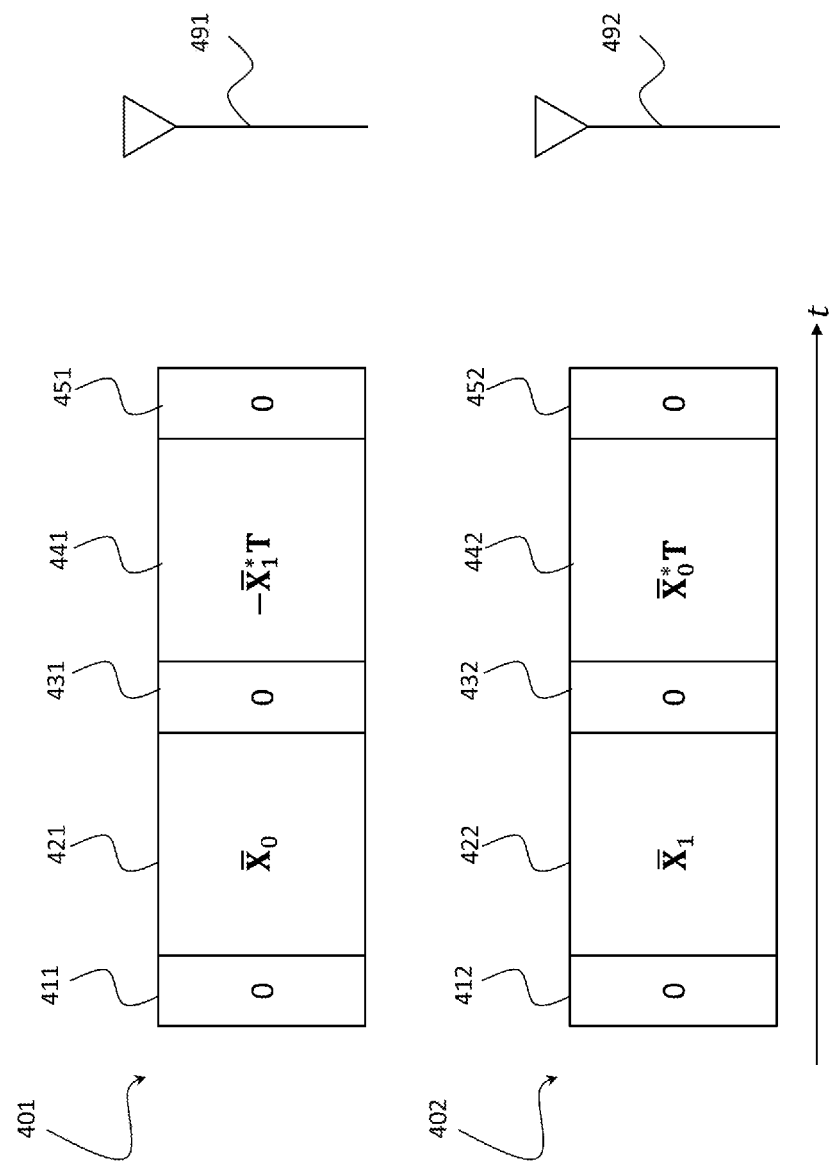

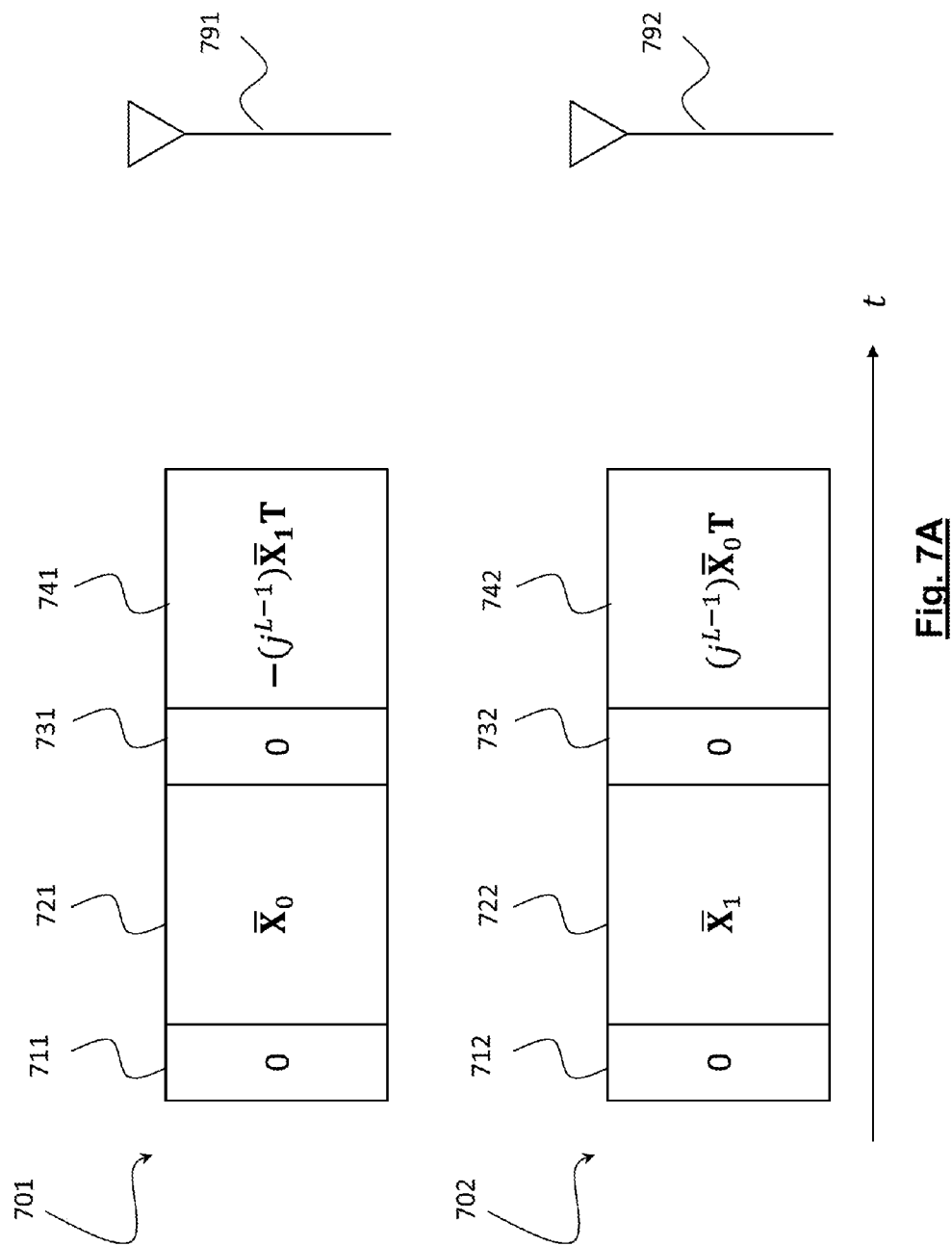

TRANSMITTER FOR FBMC SYSTEM WITH BLOCK-ALAMOUTI TYPE SPACE-TIME CODING

TECHNICAL DOMAIN

This invention generally relates to the field of telecommunication systems using a Filter Bank Multi-Carrier modulation, also called FBMC systems. It also relates to Multiple Input Single Output (MISO) or even Multiple Input Multiple Output (MIMO) telecommunication systems using a space-time coding.

STATE OF PRIOR ART

Telecommunication systems using multi-carrier modulation are well known in the state of the art. The principle of such modulation consists of dividing the transmission band into a plurality of frequency sub-channels associated with sub-carriers and modulating each of these sub-carriers with the data to be transmitted.

The most widespread multi-carrier modulation is undoubtedly OFDM (Orthogonal Frequency Division Multiplexing) modulation. However, OFDM modulation is not an optimum solution for applications requiring high out-of-band rejection rates because the spectral occupancy of an OFDM signal is significantly larger than the band of sub-carriers that it uses due to spreading of secondary lobes.

FBMC (Filter Bank Multi Carrier) modulation is a multi-carrier modulation that can give better spectral positioning in the band of sub-carriers. It is also one of the possible solutions for fifth generation telecommunication systems.

The principle of FBMC modulation is based on synthesis by filter bank on transmission and analysis by filter bank on reception, the product of the transfer function of a filter on transmission by the transfer function of the corresponding filter on reception being equal to the transfer function of the Nyquist filter.

FBMC systems are typically implemented in the temporal domain The structure of an FBMC system implemented in the temporal domain has been described in detail in the article by B. Hirosaki entitled "An orthogonally multiplexed QAM system using the discrete Fourier transform" published in IEEE Trans on Comm., vol. 29 No. 7, pp. 982-989, July 1981, and in the article by P. Siohan et al. entitled <<Analysis and design of OFDM/OQAM systems based on filterbank theory" published in IEEE Trans. on signal processing, vol. 50, No 5, pp. 1170-1183, May 2002. FBMC systems implemented in the temporal domain make use of polyphase filter networks which is the reason for their name PPN-FBMC (Polyphase Network FBMC).

More recently, it was proposed to implement an FBMC system in the frequency domain as described in the document by M. Bellanger et al. entitled "FBMC physical layer: a primer" available on the www.ict-phydyas.org site. FBMC systems implemented in the frequency domain make use of spectral spreading which is the reason for their name FS-FBMC (Frequency Spread FBMC).

The structure of an FS-FBMC system is shown in FIG. 1.

At the transmitter, QAM modulation symbols to be transmitted at a rate Nf where f=1/T are grouped in blocks with size N, $x_0[n], \ldots, x_{N-1}[n]$ in which n is the temporal index of the block. Each block of N symbols is supplied in parallel to N input channels of a preprocessing module 110, called OQAM (Offset QAM). The function of this preprocessing module is to demultiplex the real part and the imaginary part of input symbols at a frequency 2f such that one of the two samples transmitted at the same time on two successive sub-channels or one of two samples transmitted at two successive intervals on the same sub-channel is real, and the other is imaginary. Each of the N output channels of the preprocessing module 110 corresponds to a sub-channel.

Each sub-channel is then spread on an interval of 2K−1 adjacent sub-carriers, centred on a central sub-carrier of the sub-channel. More precisely, each OQAM data is spread on 2K−1 adjacent sub-carriers and is weighted by the value (real) of the transfer function of the synthesis filter at the corresponding frequency.

The frequency spreading and filter module using the prototype filter is denoted 120. Each OQAM data $d_i[n]$ at the input to module 120 is spread over 2K−1 adjacent sub-carriers to give:

$$d_{i,k}[n] = d_i[n] G_k, k = K+1, \ldots, 0, \ldots K-1 \qquad (1)$$

Data with the same parity i and i+2 are spectrally separated and data with opposite polarities i and i+1 overlap as shown on FIG. 2A. However, this overlap does not generate any interference because two data with opposite parities are necessarily located on the real axis and the imaginary axis respectively and are separated by T/2. For example in FIG. 2A, the data $d_i[n]$ and $d_{i+2}[n]$ are real values (represented by continuous lines) while data $d_{i+1}[n]$ is an imaginary value (represented by dashed lines). Imaginary values are presented to the input of the IFFT module with an offset of T/2 relative to the real values. Orthogonality in the complex plane is kept by filtering by the prototype filter knowing that the coefficients $G_k$ are real.

Frequency spread and filtered data are then processed by an IFFT with size KN in 130.

The temporal samples block at the output from the IFFT is combined by the combination module 140 as shown in FIG. 3. The set of samples at the output from the IFFT represents one FBMC symbol in the temporal domain, two successive FBMC symbols being offset by T/2 (in other words by N/2 samples) and the duration of each of the FBMC symbols is equal to KT (in other words the size of KN samples). An FBMC symbol is combined in module 140 with the K−1 preceding FBMC symbols and the K−1 following FBMC symbols. This is why K is also called the overlapping factor or interlacing factor. It will be noted that a sample at the output from the combination module 140 is the sum of de 2K−1 samples of consecutive FBMC symbols.

The signal this obtained is then translated at a carrier frequency.

After transmission on channel 150, the received signal demodulated in base band is sampled by the receiver at rate Nf and is then converted into blocks size KN by the series-parallel converter 160.

A sliding FFT (the FFT window sliding by N/2 samples between two FFT calculations) with size KN is made in the FFT module, 170, on blocks of KN consecutive samples at the output from the series-parallel converter 160.

FFT outputs are then filtered and spectrally despreaded in module 180. The despreading operation takes place in the frequency domain as shown in FIG. 2B. More precisely, the samples $\hat{d}_{i,k}'[n]$, $k=K+1, \ldots, 0, \ldots K-1$ corresponding to 2K−1 frequencies $(i-1)K+1, \ldots 1K, \ldots (i+1)K-1$ of the FFT are multiplied by values of the transfer function of the analysis filter (translated in frequency from that of the prototype filter) to the frequencies concerned and the results obtained are then summated, to give:

$$d_i^r[n] = \sum_{k=-K+1}^{K-1} G_k \check{d}_{i,k}^r[n] \qquad (2)$$

As shown in FIG. 2A, data from rows with the same parity, for example $d_i^r[n]$ and $d_{i+2}^r[n]$, are obtained using non-contiguous sample blocks while data from two consecutive rows with opposite polarities overlap. Thus, data $d_{i+1}^r[n]$ are obtained using samples $\check{d}_{i,k}^r[n]$, $k=1, \ldots, K-1$ and samples $\check{d}_{i+2,k}^r[n]$, $k=-K+1, \ldots, 1$.

Real data despreading is represented by continuous lines while imaginary data despreading is represented by dashed lines.

The data $d_i^r[n]$ thus obtained are then input to a post-processing module 190, performing the inverse processing to that done in module 110, in other words an OQAM demodulation. QAM symbols are thus restored.

The FBMC technology is one of the candidate technologies for the fifth generation of wireless telecommunication systems. In particular, it should make it possible to satisfy spectral fragmentation and asynchronous transmission needs of Machine Type Communications (MTC).

However, application of the FBMC technology to telecommunication systems with spatial diversity of the MIMO (Multiple Input Multiple Output) type is much more complicated than with OFDM because the FBMC transmission makes intrinsic use of orthogonality in the complex plane to eliminate interference between FBMC symbols.

An Alamouti type of Spatial Time Block Coding (STBC) has recently been disclosed for an FBMC system in the paper by M. Renfors et al. entitled "A block-Alamouti scheme for filter bank based multicarrier transmission" published in Proceedings of European Wireless Conference EW 2010, Apr. 12-15, 2010, Lucca, Italy. 2010. pp. 1031-1037.

Note firstly that an Alamouti coding is a Space Time Block Coding (STBC) applicable to a configuration with two transmission antennas and one reception antenna. Its coding matrix is given by:

$$C = \begin{pmatrix} x_0 & x_1 \\ -x_1^* & x_0^* \end{pmatrix} \qquad (3)$$

in which $x_0$ and $x_1$ are two complex symbols (belonging to a modulation alphabet) to be transmitted. During a first use of the channel (in other words during a first transmission interval) the transmission antennas transmit $x_0$ and $x_1$ respectively, and during a second use of the channel these antennas transmit $-x_1^*$ and $x_0^*$.

The signals received during the first and second use of the channel, $y_0$, $y_1$ respectively can then be expressed in the following form:

$$y_0 = h_0 x_0 + h_1 x_1 + n_0 \qquad (4\text{-}1)$$

$$y_1 = h_0 x_1^* + h_1 x_0^* + n_1 \qquad (4\text{-}2)$$

in which $h_0$, $h_1$ are the complex coefficient of the first elementary channel between the first transmission antenna and the reception antenna, and the complex coefficient of the second elementary channel between the second transmission antenna and the reception antenna respectively, and in which $n_0$, $n_1$ are noise samples assumed to be additive, independent and derived from the same centered white Gaussian process.

Assuming that the channel is known, the receiver estimates the transmitted symbols from a combination of received signals:

$$\hat{x}_0 = \frac{1}{|h_0|^2 + |h_1|^2}(h_0^* y_0 + h_1 y_1^*) = x_0 + \frac{h_0^* n_0 + h_1 n_1^*}{|h_0|^2 + |h_1|^2} \qquad (5\text{-}1)$$

$$\hat{x}_1 = \frac{1}{|h_0|^2 + |h_1|^2}(h_1^* y_0 - h_0 y_1^*) = x_1 + \frac{h_1^* n_0 - h_0 n_1^*}{|h_0|^2 + |h_1|^2} \qquad (5\text{-}2)$$

The Renfors article mentioned above uses an adapted filter technique already used for Alamouti coding in the presence of intersymbol interference, presented in the paper by E. Lindskog et al. entitled "A transmit scheme for channels with intersymbol interference" published in Proc. IEEE of Int'l Conf. on Communications, ICC 2000, pp. 307-311, June 2000.

The Alamouti coding is done by blocks of input data vectors, one block being compose of a sequence of L column vectors and that can therefore by represented by a matrix $\overline{X}$ with size N×L in which N is the number of sub-carriers. Each column vector in the matrix $\overline{X}$, namely $X^m$, $m=0, \ldots, L-1$, in this case represents a vector of complex symbols at the output from the OQAM modulator. Remember that due to the OQAM modulation, one of any two adjacent elements (along rows or columns) of the matrix $\overline{X}$ is real and the other is imaginary.

If we denote two consecutive blocks as $\overline{X}_0$ and $\overline{X}_1$, the block-Alamouti coding as disclosed in the Renfors paper can be expressed in the form:

$$\overline{C} = \begin{pmatrix} \overline{X}_0 & \overline{X}_1 \\ -\overline{X}_1^* T & \overline{X}_0^* T \end{pmatrix} \qquad (6)$$

In this case, block columns in the block matrix represent antennas and the block rows represent uses of the channel. In each block, the rows represent sub-carriers and the columns represent time. T is an anti-diagonal matrix with size L×L in which all anti-diagonal elements are equal to 1, and thus represents temporal inversion. Thus, if $\overline{X}$ is a sequence of vectors $X^0, X^1, \ldots, X^{L-1}$ the block $\overline{X}T$ is composed of the sequence $X^{L-1}, X^{L-2}, \ldots X^0$.

FIG. 4 diagrammatically represents a sequence of symbol blocks transmitted by an FBMC transmitter with block-Alamouti coding.

A first sequence of blocks, 401, is composed of a first guard block 411, a first block of L symbol vectors, $\overline{X}_0$, 421, a second guard block, 431, a first transformed block, $-\overline{X}_1^*T$, 441, composed of L symbol vectors, followed by a third guard block 451.

A second sequence of blocks, 402, is composed of a first guard block 421, a second block composed of L symbol vectors, $\overline{X}_1$, 422, a second guard block, 432, a second transformed block, $\overline{X}_0^*T$, 442, composed of L symbol vectors, followed by a third guard block 452.

The guard blocks are composed of null symbols and their purpose is to isolate successive blocks from interference generated by adjacent blocks.

The first sequence of blocks is transmitted by the first antenna 491 after FBMC modulation. The signal obtained at the output from the FBMC modulator can be considered as a sequence of FBMC symbols that overlap in time, as explained with reference to FIG. 3. The signal thus obtained is transmitted on the first antenna after having been translated in the RF band.

Similarly, the second sequence of blocks is transmitted by the second antenna 492 after having been modulated by a second FBMC modulator with a structure identical to the first.

FIG. 5 diagrammatically represents the architecture of an FBMC receiver capable of receiving sequences of symbol blocks transmitted by the transmitter in FIG. 4. It is essential to note that this FBMC has a classical architecture (temporal implementation) and not an FS-FBMC architecture (frequency implementation).

The receiver comprises a sampling module 510 to sample the signal received in base band at rate Nf in which N is the number of sub-carriers and f is the frequency of FBMC symbols. Samples are grouped together in the form of blocks with size N by a series-parallel converter 520.

Each block is filtered by a transmultiplexer composed of a bank of N polyphase filters (PPN), 530, and is then subjected to a FFT with size N, in the FFT module 540, operating on the N outputs from these filters.

The receiver is assumed to be synchronised on the FBMC symbols, in other words the beginning of an FFT window coincides with the first sample of an FBMC symbol (transmitted by one of the transmission antennas). Moreover, the receiver is assumed to be synchronised on channel use times such that it knows the reception times of the first and second blocks.

A demultiplexer 550 provides FFT output vectors on a first output 551 during the first use of the channel and on a second output 552 during the second use of the channel. The L vectors (size N) generated sequentially on the first output are stored in a first buffer memory 561 configured in the form of a FIFO (First In First Out) buffer. The L vectors generated sequentially on the second output are also stored in a second buffer memory 562 configured in the form of a LIFO (Last In First Out) buffer. The conjugation module 570 thus reads the L vectors in the inverse order to the order in which they are stored, to achieve a temporal inversion, and makes a complex conjugation of each of these vectors.

Each element of a vector generated on the first output is multiplied in 581 by the complex conjugate of the coefficient of the first elementary channel between the first transmission antenna and the reception antenna, at the frequency of the sub-carrier carrying the element concerned (in this case the operation is symbolised by a multiplication of the vector at the buffer memory output by the matrix $H_0^*$ defined below) and in 583 by the complex conjugate of the coefficient of the second elementary channel between the second transmission antenna and the reception antenna, at the same sub-carrier frequency (in this case the operation is symbolised by a multiplication of the samples vector at the FFT output by the matrix $H_1^*$). It is understood that the matrices $H_0$ and $H_1$ in this case have a size of N×N and represent the coefficients of the elementary channels for the N sub-carriers. The matrices $H_0$ and $H_1$ are diagonal. It is assumed that the matrices $H_0$ and $H_1$ are constant over the duration of the sequence (assumption of flat fading in time).

Similarly, each element of a vector generated on the second output is multiplied in 582 by the coefficient of the channel between the first transmission antenna and the reception antenna at the frequency of the sub-carrier carrying the element concerned (operation symbolised by a multiplication of the vector at the FFT output by the matrix $H_0$) and in 584 by the coefficient of the channel between the second transmission antenna and the reception antenna at the same sub-carrier frequency (operation symbolised by a multiplication of the vector at the FFT output by the matrix $H_1$).

The vectors at the output from the multiplier 581 are summated element by element with the vectors at the output from the multiplier 584, in the summator, 591. Successive vectors output from the summator 591 are then supplied to a first OQAM demodulator (not shown).

Similarly, the vectors at the output from the multiplier 583 are subtracted element by element from the vectors at the output from the multiplier 582, in the summator, 592. Successive vectors output from the summator 592 are then supplied to a second OQAM demodulator (not shown).

In other words, if the matrices with size N×L representing the sequence of L column vectors at the FFT output are denoted $\overline{Y}_0$ and $\overline{Y}_1$ the first time and the second time respectively that the channel is used, the estimates of symbol vectors $\overline{X}_0$ and $\overline{X}_1$ are obtained by:

$$\hat{\overline{X}}_0 = \frac{1}{Tr(H_0^* H_0 + H_1^* H_1)}(H_1^* \overline{Y}_0 + H_0 \overline{Y}_1^* T) \qquad (7\text{-}1)$$

$$\hat{\overline{X}}_1 = \frac{1}{Tr(H_0^* H_0 + H_1^* H_1)}(H_1^* \overline{Y}_0 - H_0 \overline{Y}_1^* T) \qquad (7\text{-}2)$$

The reception method described above functions for an FBMC receiver implemented by means of a polyphase filter bank. It is not applicable to an FS-FBMC receiver like that described with reference to the right part of FIG. 1, considering that filtering is then done downstream from the FFT.

The purpose of this invention is to disclose a method of transmitting a sequence of FBMC symbol blocks coded by means of block-Alamouti coding that enables very simple reception by an FS-FBMC receiver.

Presentation of the Invention

This invention is defined by an FBMC transmission method using at least a first symbols block and a second symbols block ($\overline{X}_0$, $\overline{X}_1$), each symbols block comprising a temporal sequence of L real vectors with a predetermined size N, said method having a first and a second FBMC modulation channel, each FBMC modulation channel being associated with an antenna and, during a first use of the transmission channel, the vectors of the first block and the vectors of the second block are input to the first FBMC modulation channel and to the second FBMC modulation channel respectively, in the order of said temporal sequence;

the first block is transformed by multiplying the vectors of this block by a factor $j^{L-1}$ in which L is an even number and by inverting the temporal order of the sequence of vectors thus obtained, and the second block is transformed by multiplying the vectors of this block by a factor $-(j^{L-1})$ and by inverting the temporal order of the sequence of vectors thus obtained;

during a second use of the transmission channel, the vectors of the first and second blocks thus transformed are supplied to the second modulation channel and the first FBMC modulation channel respectively.

According to a first variant, each FBMC modulation channel advantageously comprises an OQAM preprocessing step alternately supplying real data and imaginary data, each data thus obtained being spread over a plurality 2K−1 of adjacent sub-carriers and filtered in the spectral domain by a prototype filter to obtain a vector of KN components, the vector of KN components being subjected to an IFFT with size KN to generate an FBMC symbol of KN samples, consecutive FBMC symbols being offset by N/2 samples, each FBMC symbol being combined with the K−1 preceding FBMC symbols and the K−1 following FBMC symbols to provide an antenna signal transmitted by an antenna associated with said channel, after translation in the RF band.

According to a second variant, each FBMC modulation channel comprises an OQAM preprocessing step supplying a vector of N alternatively real and imaginary components, the vector of N components being subjected to an IFFT with size N to generate a plurality of sub-channels, each sub-channel being filtered by a polyphase filter, the polyphase filters being versions translated in frequency by 2k/T of a prototype filter for which the pulse response has a duration of KT in which T is the sampling period, the outputs from the polyphase filters being oversampled by a factor N/2 and delayed by 0 to N−1 sampling periods before being summated to provide an antenna signal transmitted by an antenna associated with said channel, after translation in the RF band.

According to a first advantageous embodiment, when the channel is used for the first time, a guard block is provided consisting of a predetermined number of null vectors to the first and second modulation channels before providing the first block vectors and the second block vectors respectively to them, and when the channel is used for the second time, a guard block is provided consisting of said predetermined number of null vectors to the first and second modulation channels before providing the vectors of the second transformed block and the vectors of the first transformed block respectively to them.

Preferably, the predetermined number of null vectors is chosen to be equal to K+E in which E is the temporal spread of the transmission channel expressed as a number of samples.

According to a second advantageous embodiment, when the channel is used for the first time, first and second preambles are provided consisting of a predetermined number of vectors known to the receiver, to the first and second modulation channels before providing the first block vectors and the second block vectors respectively to them, and when the channel is used for the second time, a guard block is provided consisting of said predetermined number of null vectors to the first and second modulation channels before providing the vectors of the second transformed block and the vectors of the first transformed block respectively to them.

Preferably, said predetermined number is chosen to be equal to K+E in which E is the temporal spread of the transmission channel expressed as a number of samples.

The number L may typically be a power of 2.

The invention also relates to an FBMC transmitter adapted to transmit at least a first and a second symbols block ($\overline{X}_0$, $\overline{X}_1$), each symbols block comprising a temporal sequence of L real vectors with predetermined size N, first and second FBMC modulation means associated with a first and a second transmission antenna respectively, in which:

during a first use of the transmission channel, the vectors of the first block and the vectors of the second block are provided to the first FBMC modulation channel and to the second FBMC modulation channel respectively, in the order of said temporal sequence, and in that said transmitter comprises:

first transformation means adapted to transform the first block by multiplying the vectors of this block by a factor $j^{L-1}$ in which L is an even number, and by inverting the temporal order of the sequence of vectors thus obtained, and second transformation means adapted to transform the second block by multiplying the vectors of this block by a factor $-(j^{L-1})$ and by inverting the temporal order of the sequence of vectors thus obtained;

the FBMC transmitter being configured such that when the transmission channel is used for the second time, the first and second transformation means supply vectors of the first and second blocks thus transformed to the second modulation channel and to the first FBMC modulation channel.

BRIEF DESCRIPTION OF THE DRAWINGS

Other characteristics and advantages of the invention will become clear after reading preferred embodiments of the invention, with reference to the appended figures among which:

FIG. 3 illustrates the combination of FBMC symbols in FIG. 1;

FIG. 4 diagrammatically represents the transmission of two sequences of symbol blocks transmitted by an FBMC transmitter using block-Alamouti coding known in the state of the art;

FIG. 7A diagrammatically represents the transmission of two sequences of symbol blocks by an FBMC transmitter using a first block-Alamouti coding according to a first example embodiment of the invention;

DETAILED PRESENTATION OF PARTICULAR EMBODIMENTS

Figure 1:
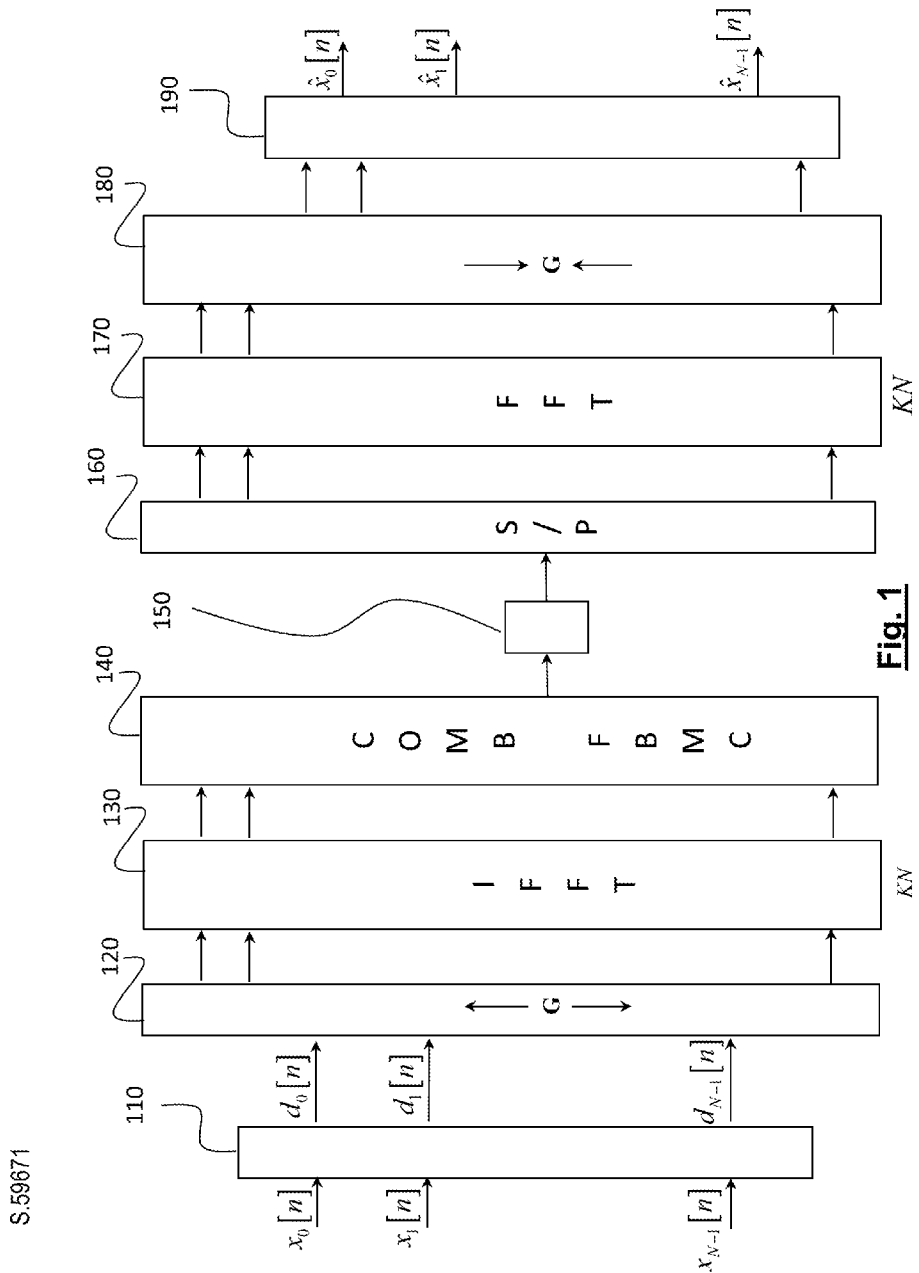
FIG. 1 diagrammatically shows a known FS-FBMC telecommunication system according to the state of the art.
Figure 2A:
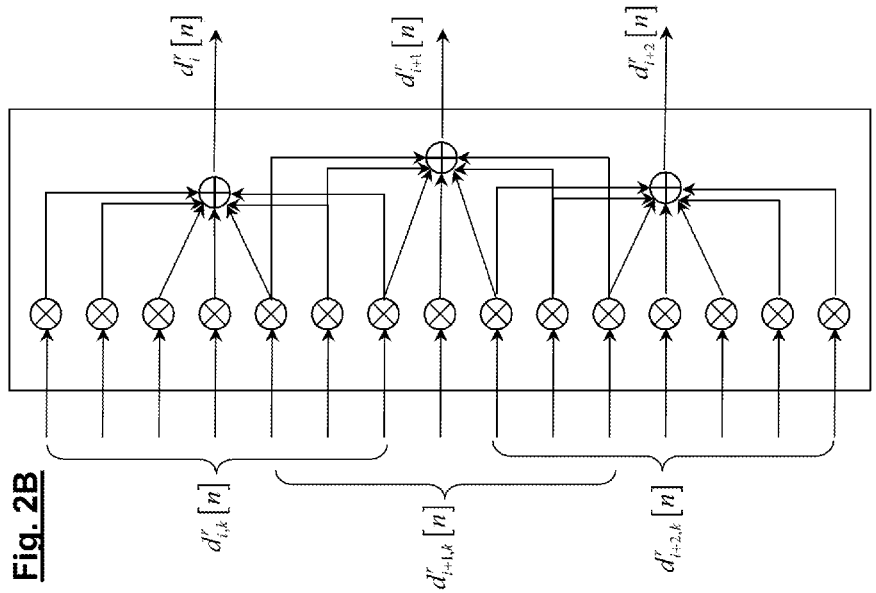
FIG. 2A illustrates the spectral spreading done upstream from the IFFT module in FIG. 1.
Figure 2B:
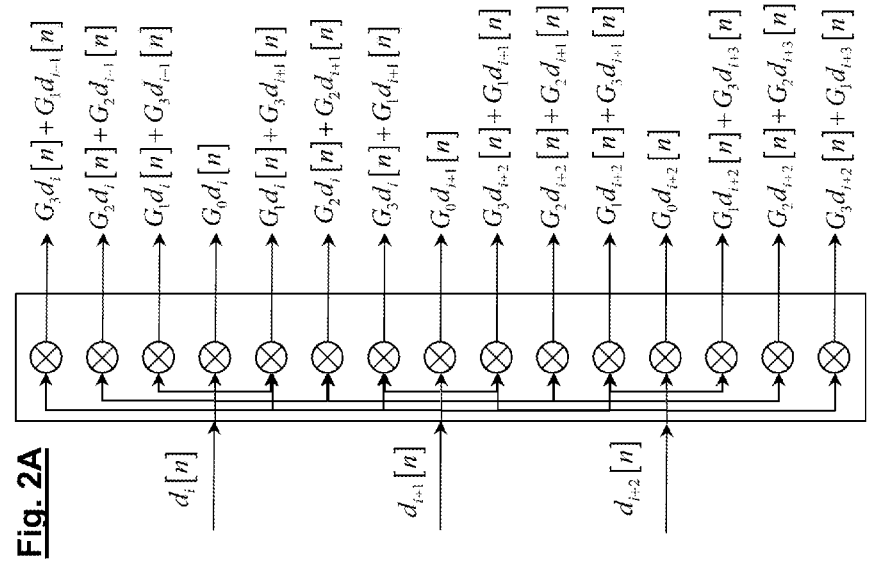
FIG. 2B illustrates the spectral despreading done downstream from the IFFT module in FIG. 1.
Figure 5:
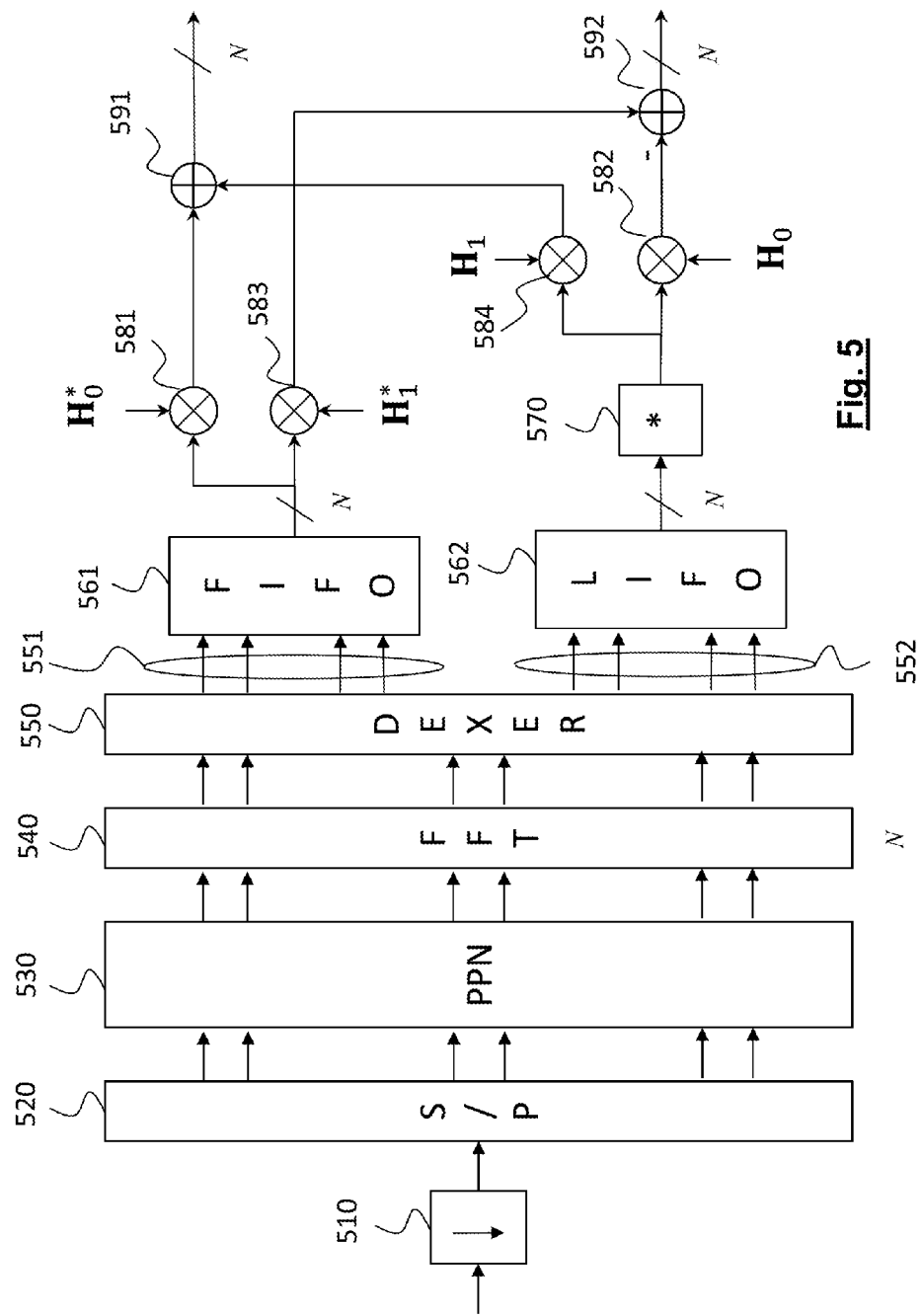
FIG. 5 diagrammatically represents the architecture of an FBMC receiver capable of receiving sequences of symbol blocks transmitted by the transmitter in FIG. 4.

We will start by considering an FS-FBMC transmitter like that described with reference to FIG. 1, to facilitate understanding the notation.

Unlike the previous notations, the column vectors $X^m$, $m=0, \ldots, L-1$, with size N, will represent vectors of input data in the following, in other words data at the input to the OQAM modulator. Therefore the values of elements of these vectors are real.

The signal transmitted by the transmitter at time m can be represented by a column vector $Z^m$ with size KN for which the elements are samples at frequency Nf. The vector $Z^m$ can be expressed as a function of input data vectors $X^{m-(K-1)}, \ldots, X^m, \ldots, X^{m+(K-1)}$, namely:

$$Z^m = F^H G(X^m \square M^m) + \qquad (8)$$
$$\sum_{p=1}^{K-1} Q_{\frac{pN}{2}} F^H G(X^{m-p} \square M^{m-p}) + Q_{KN-\frac{pN}{2}} F^H G(X^{m+p} \square M^{m+p})$$

in which $\square$ is the Hadamard product, F is the matrix of the discrete Fourier transform with size KN×KN, G is a matrix with size KN×N representing spectral spreading and the transfer function of the prototype filter in the frequency domain, namely:

$$G = \begin{pmatrix} G_{K-1} & 0 & \cdots & 0 \\ \vdots & G_{K-1} & \ddots & \vdots \\ G_0 & \vdots & \ddots & 0 \\ \vdots & G_0 & \ddots & G_{K-1} \\ G_{-K+1} & \vdots & \ddots & \vdots \\ 0 & G_{-K+1} & \ddots & G_0 \\ \vdots & \ddots & \ddots & \vdots \\ 0 & \cdots & 0 & G_{-K+1} \end{pmatrix} \qquad (9)$$

$M^m$ is a column vector with size N that translates the OQAM modulation, namely a vector for which the elements are given by:

$$M^m[k] = j^{m+k}(-1)^{km} \qquad (10)$$

and $Q_l$ is an offset matrix of l samples with size KN×KN defined by:

$$Q_\ell = \begin{pmatrix} 0_{\ell \times (KN-\ell)} & 0_{\ell \times \ell} \\ I_{KN-\ell} & 0_{(KN-\ell) \times \ell} \end{pmatrix} \qquad (11)$$

in which $I_{KN-l}$ is the size identity matrix (KN-l)×(KN-l)

It will be understood that the terms under the sum sign in expression (8) represent the 2K-1 FBMC symbols that are combined in FIG. 3.

The signal received by the FBMC receiver at time m can be expressed similarly in the form of a data vector at the output from the OQAM demodulator, in this case denoted $Y^m$, with size KN. The vector $Y^m$ can be expressed as a function of the vector $Z^m$ representing the transmitted signal, that is, if we ignore the noise term:

$$Y^m = (G^H F H_0 Z^m) \square M^{m*} \qquad (12)$$

or, allowing for the fact that $G^H F F^H G = I_N$ and that $(X^m \square M^m) \square M^{m*} = X^m$:

$$Y^m = H_0 \left( X^m + \sum_{p=1}^{K-1} U^p(X^{m-p} \square M^{m-p}) \square M^{m*} + \sum_{p=1}^{K-1} V^p(X^{m+p} \square M^{m+p}) \square M^{m*} \right) \qquad (13)$$

in which:

$$U^p = G^H F Q^{\frac{pN}{2}} F^H G \text{ and } V^p = G^H F Q^{KN-\frac{pN}{2}} F^H G \qquad (14)$$

It will be noted that $G^H = G^T$, considering that the coefficients of the filter transfer matrix are real.

We will now assume that a block-Alamouti coding is made, with a coding matrix defined by:

$$\overline{C} = \begin{pmatrix} \overline{X}_0 & \overline{X}_1 \\ -\overline{X}_1 T & \overline{X}_0 T \end{pmatrix} \qquad (15)$$

As described below, it is possible to use a receiver implemented in the frequency domain (FS-FBMC receiver) and the two blocks at the output from the FFT module (module 170 in FIG. 1) can be combined, during the first and second use of the channel respectively.

We will use $X_0^m$ to denote the $m^{th}$ input data vector to the first block $\overline{X}_0$ and $X_1^m$ to denote the $m^{th}$ input data vector to the second block $\overline{X}_1$. We will also use $W_0^m$ to denote the $m^{th}$ samples vector at the output from the FFT module, before despreading and filtering, during the first use of the channel. Similarly, we will use $W_1^m$ to denote the $m^{th}$ samples vector at the output from the FFT module, before despreading and filtering, during the second use of the channel.

During the first use of the channel, the vector $W_0^m$ can be expressed as follows:

$$W_0^m = H_0 \left( G(X_0^m \square M^m) + \sum_{p=1}^{K-1} A^p(X_0^{m-p} \square M^{m-p}) + \sum_{p=1}^{K-1} B^p(X_0^{m+p} \square M^{m+p}) \right) + H_1 \left( G(X_1^m \square M^m) + \sum_{p=1}^{K-1} A^p(X_1^{m-p} \square M^{m-p}) + \sum_{p=1}^{K-1} B^p(X_1^{m+p} \square M^{m+p}) \right) \qquad (16)$$

where $A^p = FQ^{\frac{pN}{2}} F^H$ and $B^p = FQ^{KN-\frac{pN}{2}} F^H$ \qquad (17)

Similarly, during the second use of the channel, the vector $W_1^m$ can be expressed as follows:

$$W_1^m = -H_0 \left( G(X_1^{L-1-m} \square M^m) + \sum_{p=1}^{K-1} A^p(X_1^{L-1-m+p} \square M^{m-p}) + \sum_{p=1}^{K-1} B^p(X_1^{L-1-m-p} \square M^{m+p}) \right) + H_1 \left( G(X_0^{L-1-m} \square M^m) + \sum_{p=1}^{K-1} A^p(X_0^{L-1-m+p} \square M^{m-p}) + \sum_{p=1}^{K-1} B^p(X_0^{L-1-m-p} \square M^{m+p}) \right) \qquad (18)$$

expression in which advantage is taken of the fact that input data vectors are real values. It will be noted that in this case the size of the elementary channel transfer matrices $H_0$ and $H_1$ is KN×KN, due to spectral spreading.

If the vector block $W_1^m$, m=0, ..., L−1 is transformed by temporal inversion and complex conjugation of the block, the $m^{th}$ vector of the block thus transformed can be written as follows, from (18):

$$W_1^{L-m-1*} = -H_0^* \left( G(X_1^{m*} \square M^{L-1-m*}) + \sum_{p=1}^{K-1} A^{p*}(X_1^{m+p*} \square M^{L-1-m-p*}) + \sum_{p=1}^{K-1} B^{p*}(X_1^{m-p*} \square M^{L-1-m+p*}) \right) + \quad (19)$$

$$H_1^* \left( G(X_0^{m*} \square M^{L-1-m*}) + \sum_{p=1}^{K-1} A^{p*}(X_0^{m+p*} \square M^{L-1-m-p*}) + \sum_{p=1}^{K-1} B^{p*}(X_0^{m-p*} \square M^{L-1-m+p*}) \right)$$

Namely since:

$$M^{L-1-m*} = -M^m j^{L-1}; M^{L-1-m-p*} = -M^{m+p} j^{L-1};$$
$$M^{L-1-m+p*} = -M^{m-p} j^{L-1}$$

in which it was assumed that the size L of the block was an even number, and that:

$$A^{p*} = B^p; B^{p*} = A^p$$

the vector $W_1^{L-m-1*}$ of the inverted block can finally be written as follows:

$$W_1^{L-m-1*} = H_0^* j^{L-1} \left( G(X_1^m \square M^m) + \sum_{p=1}^{K-1} B^p(X_1^{m+p} \square M^{m+p}) + \sum_{p=1}^{K-1} A^p(X_1^{m-p} \square M^{m-p}) \right) - \quad (20)$$

$$H_1^* j^{L-1} \left( G(X_0^m \square M^m) + \sum_{p=1}^{K-1} B^p(X_0^{m+p} \square M^{m+p}) + \sum_{p=1}^{K-1} B^{p*}(X_0^{m-p} \square M^{m-p}) \right)$$

We can then estimate vectors of transmitted data $X_0^m$, $X_1^m$ by combining vectors $W_0^m$ $W_1^{L-m-1*}$:

$$\check{X}_0^m = \mu(H_0^* W_0^m + j^{L-1} H_1 W_1^{L-1-m*}) \quad (21\text{-}1)$$

$$\check{X}_1^m = \mu(H_1^* W_0^m - j^{L-1} H_0 W_1^{L-1-m*}) \quad (21\text{-}2)$$

in which $$\mu = \frac{1}{Tr(H_0^H H_0 + H_1^H H_1)},$$

then by filtering and spectral despreading and finally an OQAM demodulation:

$$\hat{X}_0^m = \mu G(H_0^* W_0^m + j^{L-1} H_1 W_1^{L-1-m*}) \square M^{m*} \quad (22\text{-}1)$$

$$\hat{X}_1^m = \mu G(H_1^* W_0^m - j^{L-1} H_0 W_1^{L-1-m*}) \square M^{m*} \quad (22\text{-}2)$$

Figure 6:
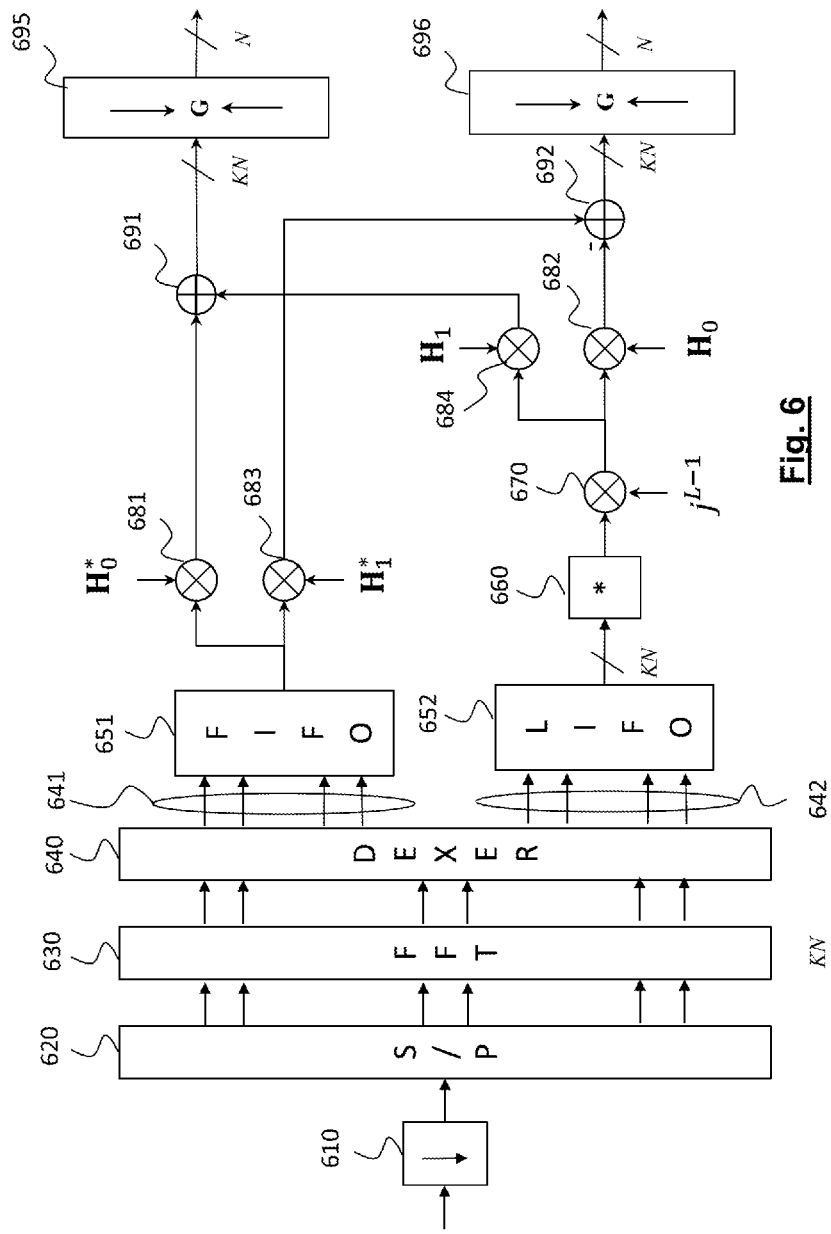
FIG. 6 diagrammatically represents the architecture of an FS-FBMC receiver capable of receiving sequences of symbol blocks coded by a block-Alamouti coding.

FIG. 6 diagrammatically represents the architecture of an FS-FBMC receiver capable of receiving sequences of symbol blocks coded by block-Alamouti coding;

The receiver comprises a sampling module 610 to sample the signal received in base band at rate Nf in which N is the number of sub-carriers and f is the frequency of FBMC symbols. Samples are grouped together in the form of blocks with size KN by a series-parallel converter 620.

The receiver is assumed to be synchronised on the FBMC symbols, in other words the beginning of an FFT window coincides with the first sample of an FBMC symbol (transmitted by one of the transmission antennas). Moreover, the receiver is assumed to be synchronised on channel use times such that it knows reception times of the first and second blocks.

The sample blocs are subjected to an FFT with size KN in the FFT module 630.

A demultiplexer 640 provides FFT output vectors on a first output 641 during the first use of the channel and on a second output 642 during the second use of the channel. The L vectors (size KN) generated sequentially on the first output are stored in a first buffer memory 651 configured in the form of a FIFO. The L vectors generated sequentially on the second output are also stored in a second buffer memory 652 configured in the form of a LIFO. The module 660 thus reads the L vectors in the inverse order (LIFO) to the order in which they are stored to achieve a temporal inversion, and also makes a complex conjugation of each of these vectors. A multiplier 670 multiplies the elements of the vectors at the output from the module 660 by $(j)^{L-1}$, in other words by j if L is an even number. In particular we could choose L equal to a power of 2: $L=2^l$ where l is an integer greater than 1.

Each element of a vector generated on the first output is multiplied in 681 by the complex conjugate of the coefficient of the first elementary channel between the first transmission antenna and the reception antenna, at the frequency of the sub-carrier carrying the element concerned (in this case the operation is symbolised by a multiplication of the vector at the buffer memory output by the matrix $H_0^*$) and in 683 by the complex conjugate of the coefficient of the second elementary channel between the second transmission antenna and the reception antenna, at the same sub-carrier frequency (in this case the operation is symbolised by a multiplication of the samples vector at the FFT output by the matrix $H_1^*$). It is understood that the matrices $H_0$ and $H_1$ in this case have a size of KN×KN and represent the coefficients of the elementary channels for the KN spectrally spread sub-carriers. We could choose an identical channel coefficient for the K frequencies derived from the same carrier. It is assumed that the matrices $H_0$ and $H_1$ are constant over the duration of the sequence (assumption of flat fading in time).

Similarly, each element of a vector generated on the second output is multiplied in 682 by the coefficient of the channel between the first transmission antenna and the reception antenna at the frequency of the sub-carrier carrying the element concerned (operation symbolised by a multiplication of the vector at the FFT output by the matrix $H_0$) and in 684 by the coefficient of the channel between the second transmission antenna and the reception antenna at the same sub-carrier frequency (operation symbolised by a multiplication of the vector at the FFT output by the matrix $H_1$).

The vectors at the output from the multiplier 681 are summated element by element with the vectors at the output from the multiplier 684, in the summator 691. Successive vectors, with size N output from the summator 691 are then supplied to a first spectral spreading and filtering module 695.

Similarly, the vectors at the output from the multiplier 682 are subtracted element by element from the vectors at the output from the multiplier 683, in the summator, 692. Successive vectors, with size N output from the summator 692 are then supplied to a second spectral spreading and filtering module 696.

An OQAM demodulation (not shown) is then performed on the vectors obtained by the first and second modules 695 and 696, to obtain estimated data vectors $\bar{X}_0^m$ and $\bar{X}_1^m$, m=0, . . . , L−1.

This invention is based on the observation that the structure of the receiver in FIG. 6 can be simplified when the FBMC transmitter uses the block-Alamouti coding defined as follows, instead of the coding given by (15):

$$\bar{C}' = \begin{pmatrix} \bar{X}_0 & \bar{X}_1 \\ -(j^{L-1})\bar{X}_1 T & (j^{L-1})\bar{X}_0 T \end{pmatrix} \quad (23)$$

In this case, multiplication by the factor $(j^{L-1})$ can be removed at reception and consequently the multiplier 670 can be omitted.

FIG. 7A diagrammatically represents the transmission of two sequences of symbol blocks by an FBMC transmitter using a first block-Alamouti coding according to a first example embodiment of the invention.

The data blocks to be transmitted in this case are considered upstream from the OQAM modulation.

A first sequence of blocks, 701, is formed by a first guard block 711, a first block of L input data vectors, $\bar{X}_0$, 721, a second guard block, 731, followed by a first transformed block, $-(j^{L-1})\bar{X}_1 T$, 741, obtained by temporal inversion and multiplication by the factor $-(j^{L-1})$ of the first input data block.

A second sequence of blocks, 702, is formed by a first guard block 712, a second block of L input data vectors, $\bar{X}_1$, 722, a second guard block, 732, followed by a second transformed block, $\hat{X}_0 T$, 742, obtained by temporal inversion and multiplication by the factor $(j^{L-1})$ of the second input data block.

The size L of the data blocks is assumed to be even, in other words $(j^{L-1})=j$ or $(j^{L-1})=-j$.

The guard blocks are composed of null vectors to prevent interference between data blocks and transformed blocks. The number of null vectors in the guard blocks is advantageously equal to K+E where K is the length of the prototype filter and E is the temporal spreading of the channel expressed as a number of samples at the sampling frequency (Nf).

The first and second sequences are transmitted by the first and second antennas, 791 and 792 respectively, after FBMC modulation.

Figure 7B:
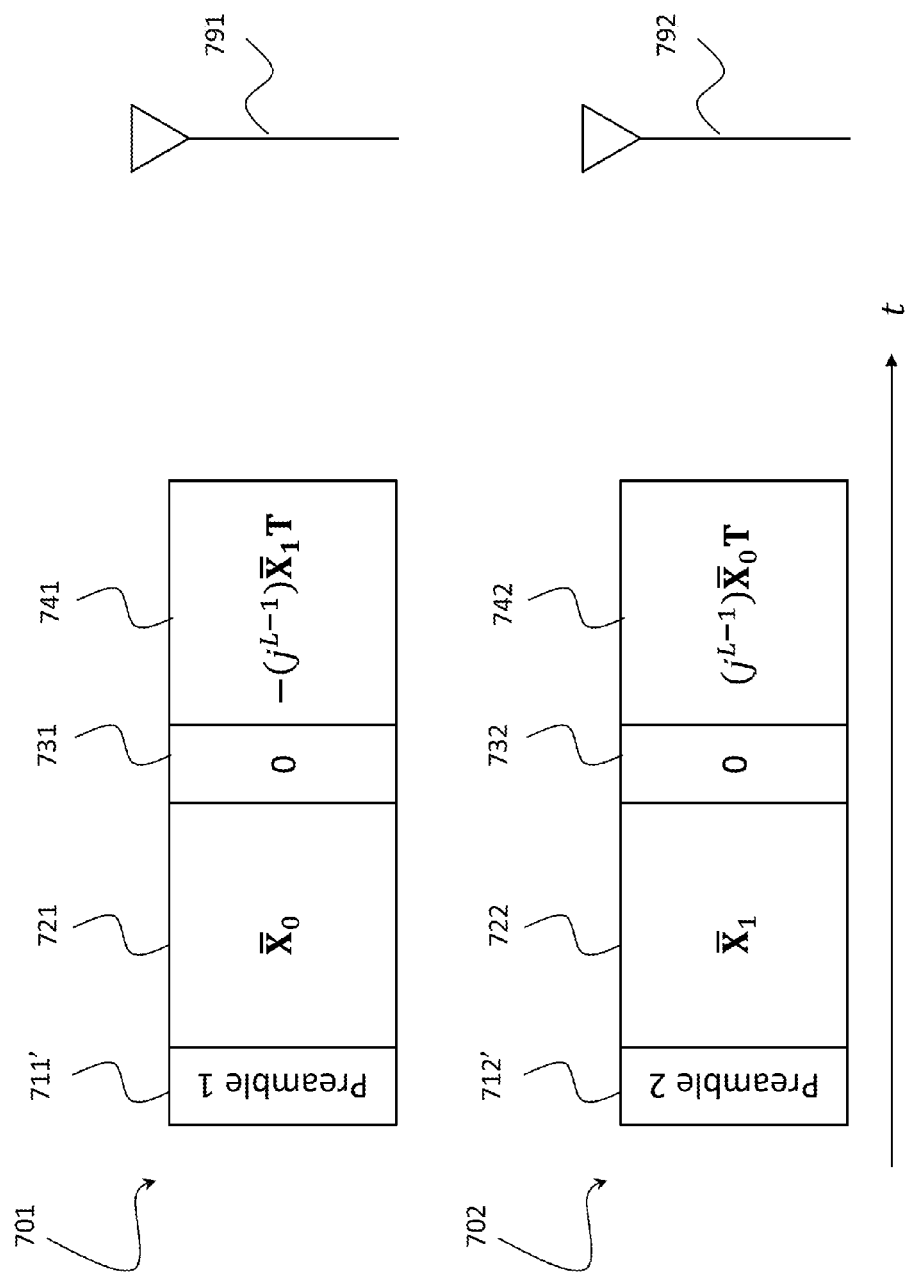
FIG. 7B diagrammatically represents the transmission of two sequences of symbol blocks by an FBMC transmitter using a second block-Alamouti coding according to a second example embodiment of the invention.

FIG. 7B diagrammatically represents the transmission of two sequences of symbol blocks by an FBMC transmitter using a second block-Alamouti coding according to a second example embodiment of the invention.

The second example is identical to the first except that the first guard block is replaced in the first sequence by a first preamble 711' and in the second sequence by a second preamble 712'. The other blocks remain unchanged and are therefore not described again.

The first and second preambles generate an interference affecting the first symbols in blocks $\bar{X}_0$ and $\bar{X}_1$, interference that does not affect blocks $-\bar{X}_1 T$ and $\bar{X}_0 T$ symmetrically. This asymmetry does not eliminate the interference for input data vectors $X_0^m$, $X_1^m$ at the beginning of the block. However, since the preamble symbols are known to the receiver, this interference can be eliminated provided that an estimate of the transmission channel is available.

Figure 8:
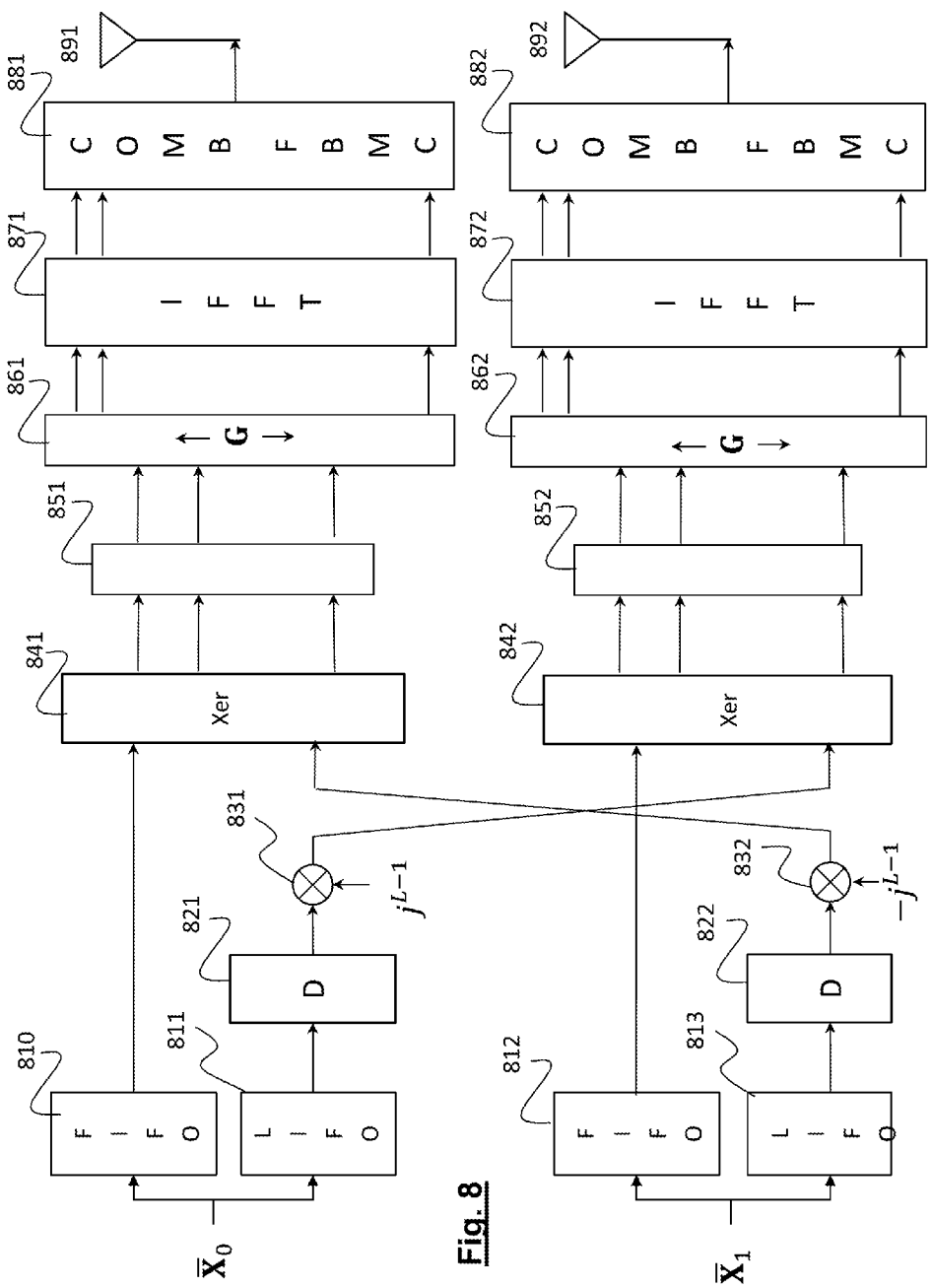
FIG. 8 diagrammatically represents the architecture of an FS-FBMC transmitter capable of transmitting sequences of symbol blocks according to FIGS. 7A and 7B.

FIG. 8 diagrammatically represents the architecture of an FS-FBMC transmitter according to a first embodiment of the invention; This transmitter transmits sequences of symbol blocks coded by Alamouti coding according to FIGS. 7A and 7B.

The symbol blocks to be transmitted are denoted $\bar{X}_0$ and $\bar{X}_1$, as above. The input data vectors $X_0^m$ are stored in a FIFO buffer, 810 and a LIFO buffer, 811. They are supplied to the multiplexer 841 in their order of arrival and to the multiplexer 842 in the inverted order of their arrival after having been delayed by the delay 821 and after having been multiplied by the factor $(j^{L-1})$ in 831. Similarly, the input data vectors $X_1^m$ are stored in a FIFO buffer, 812 and a LIFO buffer, 813. They are supplied to the multiplexer 842 in their order of arrival and to the multiplexer 841 in the order of their arrival and in the inverted order of their arrival after having been delayed by the delay 822 and after having been multiplied by the factor $-(j^{L-1})$ in 832. The first time that the channel is used, the multiplexers 841 and 842 switch the outputs of the FIFO buffers 810 and 811, onto the OQAM preprocessing modules 851 and 852 respectively. The second time that the channel is used, the multiplexers 841 and 842 switch the outputs of the LIFO buffers 812 and 813, after delay and multiplication by the above mentioned factors, onto the preprocessing modules 852 and 851 respectively. The man skilled in the art will realise that other implementations could equally well be envisaged. In particular, the arrangement composed of 810, 811, 821 can be replaced by a simple memory read in the forward direction the first time that the channel is used and in the inverse direction the second time that the channel is used, the vectors read during the second use of the channel having firstly been multiplied by the factor $(j^{L-1})$ before being supplied to the OQAM preprocessing module 852. Similarly, the arrangement composed of 812, 813, 822 can be replaced by a simple memory read in the forward direction the first time that the channel is used and in the inverse direction the second time that the channel is used, the vectors read during the second use of the channel having firstly been multiplied by the factor $(j^{L-1})$ before being supplied to the OQAM preprocessing module 851.

Modules 861-862, 871-872, 881-882 are identical to modules 820, 830, 840 respectively and therefore they will not be described again herein. Output signals from combination modules 881 and 882 are translated into the RF band before being transmitted by antennas 891 and 892 respectively.

Figure 9:
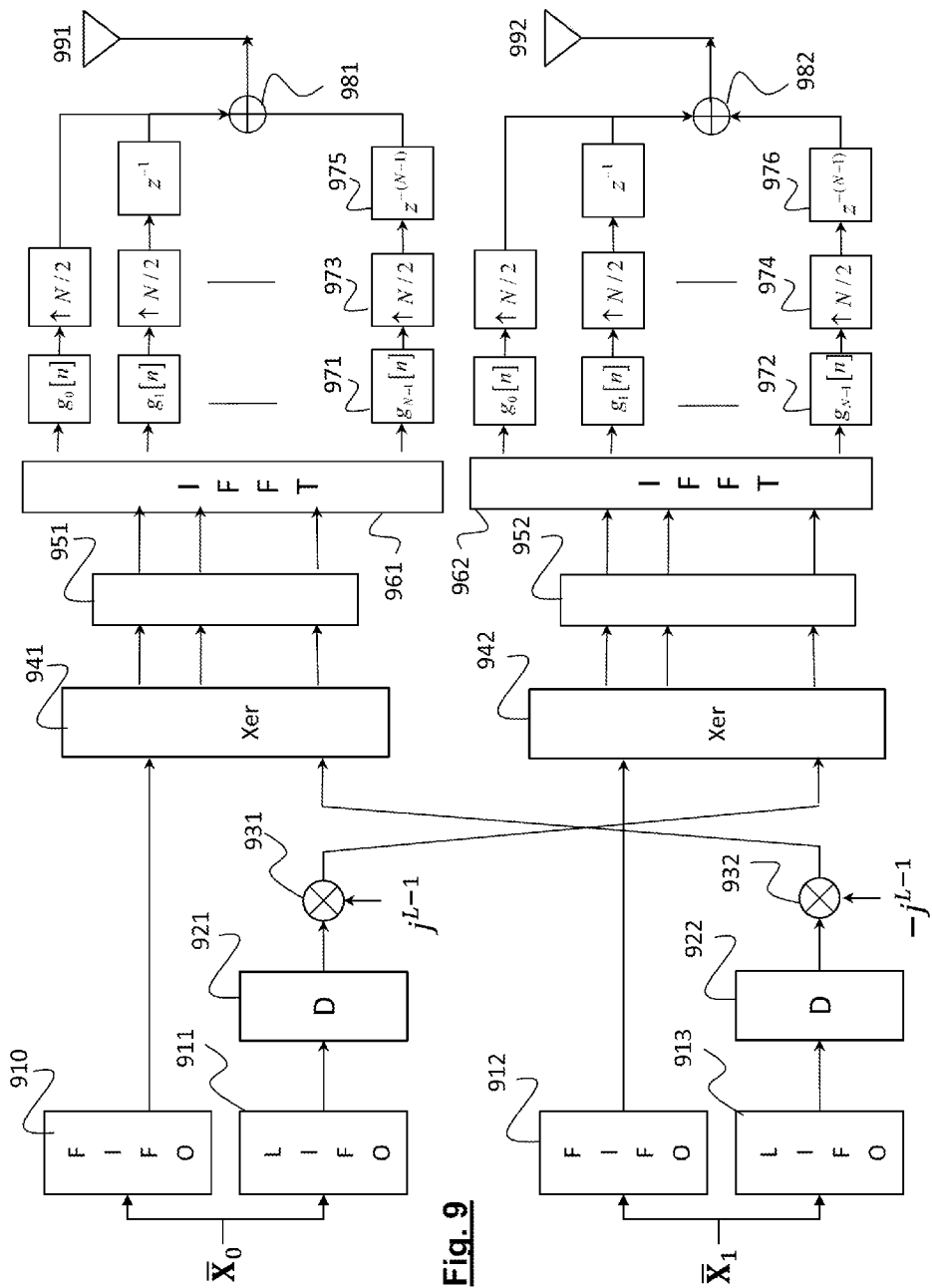
FIG. 9 diagrammatically represents the architecture of an FBMC transmitter according to an example embodiment of the invention different from that of FIG. 8.

FIG. 9 diagrammatically represents the architecture of an FBMC transmitter according to a second embodiment of the invention; This transmitter is different from that shown in FIG. 8 in that the latter is conventionally implemented in the temporal domain using a polyphase network as described in the above mentioned paper by Hirosaki.

Element references 910 to 952 are identical to elements 810 to 852 respectively.

More precisely, the transmitter comprises two FBMC modulation channels. For each of these channels, unlike the first embodiment, the data vector at the output from the OQAM module is supplied to a synthesis filter bank composed of an IFFT module with size N (961, 962), a plurality N of polyphase filters (971, 972) and a plurality N of over samplers (981, 982) by factor N/2, at the output from the different polyphase filters and finally a plurality of delays arranged in parallel and varying from 0 to N−1 sampling periods. The polyphase filters are versions translated in frequency by 2k/T from the prototype filter, the pulse response of which has duration KT.

Each of the sub-channels at the output from the IFFT are filtered by a polyphase filter. The outputs from the N oversampled and retarded polyphase filters are summated by an adder (981, 982). The output signal from the adder is translated in RF band to output an antenna signal that is then transmitted by the antenna associated with the channel (991, 992).

The invention claimed is:

1. A filter bank multi-carrier (FBMC) transmission method using at least a first symbols block and a second symbols block ($\overline{X}_0, \overline{X}_1$), each symbols block comprising a temporal sequence of L real vectors with a predetermined size N, comprising a first and a second FBMC modulation channel, each FBMC modulation channel being associated with an antenna, L and N being integers, the method comprising:
   initially inputting, to a transmitter, the vectors of the first block and the vectors of the second block to the first FBMC modulation channel and to the second FBMC modulation channel respectively, in the order of said temporal sequence;
   transforming the first block by multiplying the vectors of this block by a factor $j^{L-1}$ in which L is an even number and j represents the square root of −1, and by inverting the temporal order of the sequence of vectors thus obtained;
   transforming the second block by multiplying the vectors of this block by a factor $-(j^{L-1})$ and by inverting the temporal order of the sequence of vectors thus obtained; and
   subsequently supplying the vectors of the first and second blocks thus transformed to the second modulation channel and the first FBMC modulation channel, respectively.

2. The FBMC transmission method according to claim 1, wherein each FBMC modulation channel comprises an offset quadrature amplitude modulation (OQAM) preprocessing step alternately supplying real data and imaginary data, each data thus obtained being spread over a plurality 2K−1 of adjacent sub-carriers, K being an overlapping factor, and filtered in the spectral domain by a prototype filter to obtain a vector of K by N (KN) components, the vector of KN components being subjected to an IFFT with size KN to generate an FBMC symbol of KN samples, consecutive FBMC symbols being offset by N/2 samples, each FBMC symbol being combined with the K−1 preceding FBMC symbols and the K−1 following FBMC symbols to provide an antenna signal transmitted by an antenna associated with said channel, after translation in the RF band.

3. The FBMC transmission method according to claim 1, wherein each FBMC modulation channel comprises an offset quadrature amplitude modulation (OQAM) preprocessing step supplying a vector of N alternatively real and imaginary components, the vector of N components being subjected to an IFFT with size N to generate a plurality of sub-channels, each sub-channel being filtered by a polyphase filter, the polyphase filters being versions translated in frequency by 2k/T, k being an integer, of a prototype filter for which the pulse response has a duration of KT in which T is the sampling period and K being an overlapping factor, the outputs from the polyphase filters being oversampled by a factor N/2 and delayed by 0 to N−1 sampling periods before being summated to provide an antenna signal transmitted by an antenna associated with said channel, after translation in the radio frequency (RF) band.

4. The FBMC transmission method according to claim 1, wherein:
   the initially inputting includes providing a guard block including a predetermined number of null vectors to the first and second modulation channels before providing the vectors of the first block and the vectors of the second block respectively to them, and
   the subsequently supplying includes providing a guard block including said predetermined number of null vectors to the first and second modulation channels before providing the vectors of the second transformed block and the vectors of the first transformed block respectively to them.

5. The FBMC transmission method according claim 4, wherein the predetermined number of null vectors is equal to K+E in which E is the temporal spread of the transmission channel expressed as a number of samples and K is an overlapping factor.

6. The FBMC transmission method according to claim 1, wherein:
   the initially inputting includes providing first and second preambles including a predetermined number of vectors known to the receiver, to the first and second modulation channels before providing the first block vectors and the second block vectors respectively to them, and
   the subsequently supplying includes providing a guard block including said predetermined number of null vectors to the first and second modulation channels before providing the vectors of the second transformed block and the vectors of the first transformed block respectively to them.

7. The FBMC transmission method according claim 6, wherein said predetermined number is equal to K+E in which E is the temporal spread of the transmission channel expressed as a number of samples and K is an overlapping factor.

8. The FBMC transmission method according to claim 1, wherein L is a power of 2.

9. A filter bank multi-carrier (FBMC) transmitter to transmit at least a first and a second symbols block ($\overline{X}_0, \overline{X}_1$), each symbols block comprising a temporal sequence of L real vectors with predetermined size N, comprising first and second FBMC modulation means associated with a first and a second transmission antenna respectively, L and N being integers, wherein:
   initially the vectors of the first block and the vectors of the second block are provided to the first FBMC modulation channel and to the second FBMC modulation channel respectively, in the order of said temporal sequence, said transmitter comprising:
   a first transformer configured to transform the first block by multiplying the vectors of this block by a factor $j^{L-1}$, in which L is an even number and j is the square root of −1, and by inverting the temporal order of the sequence of vectors thus obtained, and
   a second transformer configured to transform the second block by multiplying the vectors of this block by a factor $-(j^{L-1})$ and by inverting the temporal order of the sequence of vectors thus obtained; and in that when the transmission channel is used for the second time, the first and second transformation means supply vectors of the first and second blocks thus transformed to the second modulation channel and to the first FBMC modulation channel.

\* \* \* \* \*